United States Patent
Kawahara et al.

(10) Patent No.: US 10,065,751 B2
(45) Date of Patent: Sep. 4, 2018

(54) LIQUID STORAGE TANKS AND SYSTEMS AND PROPULSION SYSTEMS FOR SPACE VEHICLES AND RELATED METHODS

(71) Applicants: Orbital ATK, Inc., Plymouth, MN (US); Donald E. Jaekle, Jr., Wilson, WY (US)

(72) Inventors: Gary H. Kawahara, Manhattan Beach, CA (US); Donald E. Jaekle, Jr., Wilson, WY (US); Paul Griffin, Palos Verdes Estates, CA (US); James Avramov, Eastvale, CA (US); Walter Tam, Monterey Park, CA (US)

(73) Assignee: Orbital ATK, Inc., Plymouth, MN (US)

( * ) Notice: Subject to any disclaimer, the term of this patent is extended or adjusted under 35 U.S.C. 154(b) by 225 days.

(21) Appl. No.: 15/091,453

(22) Filed: Apr. 5, 2016

(65) Prior Publication Data

US 2017/0283096 A1    Oct. 5, 2017

(51) Int. Cl.
*B64G 1/40* (2006.01)
*F17C 13/00* (2006.01)

(52) U.S. Cl.
CPC .......... *B64G 1/402* (2013.01); *F17C 13/008* (2013.01); *F17C 2201/0166* (2013.01); *F17C 2201/0171* (2013.01); *F17C 2260/016* (2013.01)

(58) Field of Classification Search
CPC .................. B64G 1/402; F17C 13/008; F17C 2201/0166; F17C 2201/0171;
(Continued)

(56) References Cited

U.S. PATENT DOCUMENTS 2,505,798 A    5/1950  Skinner
2,814,410 A *  11/1957 Hansen ................. F17C 13/086
                                                         105/362
(Continued)

FOREIGN PATENT DOCUMENTS

WO    2017052233 A1    3/2017

OTHER PUBLICATIONS

International Search Report for International Application No. PCT/US2017/024356, dated May 19, 2017, 2 pages.
(Continued)

*Primary Examiner* — Joseph W Sanderson
(74) *Attorney, Agent, or Firm* — TraskBritt

(57) ABSTRACT

Liquid storage systems for space vehicles include at least one storage tank including a tank inlet, a tank outlet, and a plurality of liquid storage compartments coupled to each other in series between the tank inlet and the tank outlet. Each liquid storage compartment includes an end plate including a porous outlet at an end of the liquid storage compartment adjacent to another liquid storage compartment. Propulsion systems for space vehicles include at least one such liquid storage tank. Methods of providing a liquid propellant to a thruster of a space vehicle include withdrawing a liquid propellant from a first compartment within a tank and flowing the liquid propellant from a second compartment into the first compartment through a porous element associated with an end plate separating the first compartment from the second compartment.

20 Claims, 4 Drawing Sheets

(58) Field of Classification Search
CPC ....... F17C 2201/0185; F17C 2260/016; B60K 2015/03111; B60K 2015/03144; B60K 2015/0775; B60K 2015/0777
See application file for complete search history.

(56) References Cited

U.S. PATENT DOCUMENTS

| | | | |
|---|---|---|---|
| 2,920,784 A * | 1/1960 | Boardman | F17C 1/08 |
| | | | 220/501 |
| 3,110,318 A | 11/1963 | Eulitz | |
| 3,145,884 A * | 8/1964 | Everett | F17C 1/00 |
| | | | 220/723 |
| 3,304,724 A | 2/1967 | Blumrich et al. | |
| 3,314,292 A | 4/1967 | Schulte et al. | |
| 3,508,578 A | 4/1970 | Stephens et al. | |
| 3,951,362 A * | 4/1976 | Robinson | B64D 37/06 |
| | | | 114/74 A |
| 3,979,005 A * | 9/1976 | Robinson | B64D 37/06 |
| | | | 206/521 |
| 4,715,399 A | 12/1987 | Jaekle, Jr. et al. | |
| 4,768,541 A * | 9/1988 | Uney | B64G 1/402 |
| | | | 137/154 |
| 4,976,398 A | 12/1990 | Bruhn | |
| 5,018,634 A * | 5/1991 | Le Touche | B64G 1/402 |
| | | | 220/4.12 |
| 5,027,597 A | 7/1991 | Soeffker et al. | |
| 5,271,226 A | 12/1993 | Stone | |
| 5,279,323 A | 1/1994 | Grove et al. | |
| 5,582,366 A | 12/1996 | Hamant et al. | |
| 5,697,212 A | 12/1997 | Koppel | |
| 5,901,557 A | 5/1999 | Grayson | |
| 6,014,987 A * | 1/2000 | List | B64D 37/08 |
| | | | 137/549 |
| 6,113,035 A | 9/2000 | Hubert | |
| 6,131,858 A | 10/2000 | Dethienne et al. | |
| 6,283,412 B1 | 9/2001 | Mango | |
| 6,571,624 B1 * | 6/2003 | Grayson | G01F 23/248 |
| | | | 73/290 R |
| 8,235,241 B2 | 8/2012 | Ramsay | |
| 8,561,631 B2 | 10/2013 | Yung et al. | |
| 9,260,205 B2 * | 2/2016 | Grayson | F02K 9/605 |
| 9,365,266 B2 * | 6/2016 | Liner | B63B 25/16 |
| 9,376,049 B2 * | 6/2016 | Campbell | B65B 3/04 |
| 9,643,741 B2 * | 5/2017 | Hu | F17C 13/008 |
| 2006/0145022 A1 * | 7/2006 | Buehler | B64G 1/402 |
| | | | 244/172.2 |
| 2010/0083671 A1 * | 4/2010 | Liner | B63B 25/16 |
| | | | 62/53.2 |
| 2011/0226781 A1 | 9/2011 | Walser et al. | |
| 2011/0289942 A1 * | 12/2011 | Lacapere | B64G 1/402 |
| | | | 62/53.2 |
| 2013/0313370 A1 | 11/2013 | Rakers | |
| 2014/0191499 A1 * | 7/2014 | Campbell | F17C 1/16 |
| | | | 280/837 |
| 2015/0069070 A1 * | 3/2015 | Iwaya | B60K 15/077 |
| | | | 220/563 |
| 2016/0001897 A1 * | 1/2016 | Nye | B64G 1/402 |
| | | | 60/204 |
| 2016/0311559 A1 * | 10/2016 | Hu | F17C 13/008 |
| 2016/0312956 A1 * | 10/2016 | Chaise | F17C 11/005 |

OTHER PUBLICATIONS

Written Opinion of the International Search Authority for International Application No. PCT/US2017/024356, dated May 19, 2017, 5 pages.

* cited by examiner

LIQUID STORAGE TANKS AND SYSTEMS AND PROPULSION SYSTEMS FOR SPACE VEHICLES AND RELATED METHODS

FIELD

Embodiments of the disclosure relate to liquid storage systems particularly adapted for use in low-gravity environments, such as systems for holding propellant or other liquids in satellites, launch vehicles, and spacecraft.

BACKGROUND

In space vehicles, liquid propellant tends to shift and slosh in storage tanks under acceleration during launch and responsive to tank movement in low-gravity environments (e.g., in space, in orbit around the Earth), potentially causing shifting of a center of mass of a space vehicle incorporating such storage tanks, resulting in undesirable vibrations, and vehicle control problems. In an attempt to reduce the sloshing, some conventional liquid storage tanks include structures therein to provide obstacles to the sloshing. Furthermore, in low-gravity environments the liquid may be positioned in any location within the storage tanks, and not necessarily at an outlet of the storage tanks. Thus, the structures may also be configured to provide surfaces that may be "wetted" by the liquid within the storage tanks, to direct the liquid toward an outlet via surface tension.

In addition, it is difficult to determine an amount of liquid in a tank in a low-gravity environment (e.g., in space, in orbit around the Earth), since the liquid does not tend to settle to a predictable side or end of the storage tank absent significant, directed gravitational or acceleration forces.

BRIEF SUMMARY

In some embodiments, liquid storage systems for space vehicles include at least one liquid storage tank including a tank inlet, a tank outlet, and a plurality of liquid storage compartments coupled to each other in series between the tank inlet and the tank outlet. The tank outlet is for withdrawing a liquid from within the at least one storage tank. Each liquid storage compartment of the plurality of liquid storage compartments includes an end plate including a porous outlet at an end of the liquid storage compartment adjacent to another liquid storage compartment.

In some embodiments, propulsion systems for a space vehicle include a liquid storage system and one or more thrusters operably coupled to an outlet of the liquid storage system. The liquid storage system includes at least one liquid storage tank, which includes a first liquid storage compartment, a second liquid storage compartment coupled to the first liquid storage compartment and to the outlet, and an end plate including a porous element separating the first liquid storage compartment and the second liquid storage compartment. The porous element includes a plurality of pores sized and configured for passage of a liquid from the first liquid storage compartment to the second liquid storage compartment responsive to a pressure differential across the porous element and to substantially inhibit passage of the liquid from the second liquid storage compartment to the first liquid storage compartment upon sloshing of the liquid in the second liquid storage compartment against the porous element.

In some embodiments, methods of providing a liquid propellant to a thruster of a space vehicle in a low-gravity environment include withdrawing a liquid propellant from a first compartment within a tank to induce a pressure differential across an end plate separating the first compartment from an adjacent second compartment and flowing the liquid propellant from the second compartment into the first compartment through a porous element associated with the end plate in response to the induced pressure differential.

DETAILED DESCRIPTION

The following description provides specific details, such as material types, material thicknesses, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional fabrication techniques and materials employed in the industry.

In the following detailed description, reference is made to the accompanying drawings, which form a part hereof, and in which is shown, by way of illustration, specific embodiments in which the disclosure may be practiced. These embodiments are described in sufficient detail to enable a person of ordinary skill in the art to practice the disclosure. However, other embodiments may be utilized, and structural, material, or operational changes may be made without departing from the scope of the disclosure. The illustrations presented herein are not meant to be actual views of any particular system, device, structure, or process, but are idealized representations that are employed to describe the embodiments of the disclosure. Similar structures or components in the various drawings may retain the same or similar numbering for the convenience of the reader; however, the similarity in numbering does not mean that the structures or components are necessarily identical in size, composition, configuration, or other property. The drawings presented herein are not necessarily drawn to scale.

As used herein, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

As used herein, any relational term, such as "first," "second," "third," "top," "bottom," etc., is used for clarity and convenience in understanding the disclosure and accompanying drawings and does not connote or depend on any specific preference, orientation, or order, except where the context clearly indicates otherwise.

Embodiments of the disclosure include liquid storage systems for use in low-gravity applications, such as in space vehicles. The liquid storage systems may be configured to inhibit and control sloshing of liquids stored therein, may be scalable to different volumes and applications, and may enable measurement of a liquid volume stored in the liquid storage systems. The liquid storage systems include multiple compartments coupled to each other in series and separated from each other by porous elements (e.g., porous plates).

Figure 1:
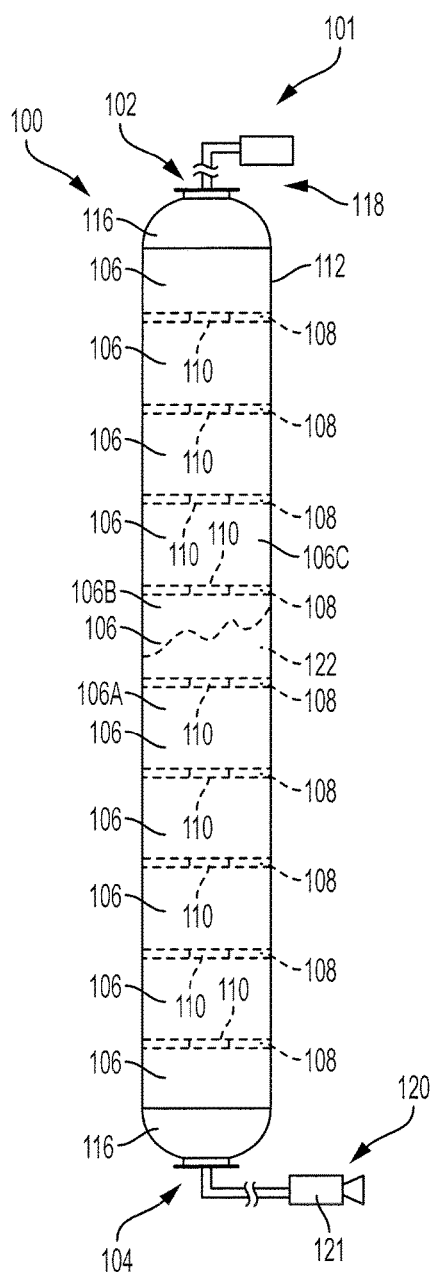
FIG. 1 shows a side view of an embodiment of a liquid storage system according to the disclosure.
Figure 2:
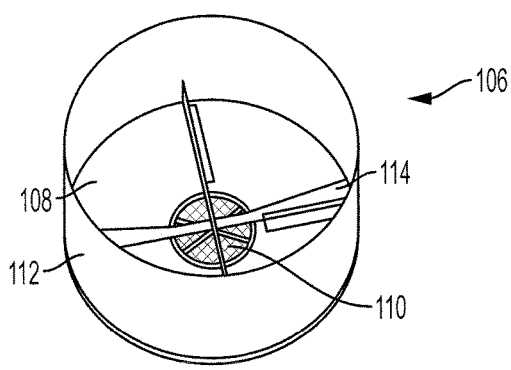
FIG. 2 shows a partial perspective view of an embodiment of a compartment of the liquid storage system of FIG. 1.
Figure 3:
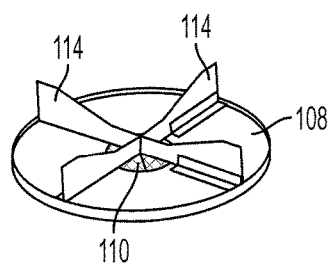
FIG. 3 shows a partial perspective view of a portion of the compartment of FIG. 2.

FIG. 1 shows a side view of a tank 100 of a liquid storage system 101 according to an embodiment of the disclosure. The liquid storage tank 100 includes a tank inlet 102, a tank outlet 104, and a plurality of liquid storage compartments 106 longitudinally coupled to each other in series between the tank inlet 102 and the tank outlet 104. FIGS. 2 and 3 show detailed views of portions of a single compartment 106 of the plurality of liquid storage compartments 106. The tank 100 may be configured for storing any liquid in a zero-gravity environment, such as a liquid propellant (e.g., a conventional spacecraft propellant), a liquid component of a bipropellant system, water, liquid oxygen, liquid nitrogen, or oil, for example.

Referring to FIGS. 1-3, the compartments 106 of the tank 100 may be separated from each other by respective end plates 108. The end plates 108 may be associated with (e.g., include or be coupled to) respective porous elements 110 to provide fluid communication between adjacent compartments 106 of the tank 100, in series. Thus, the porous elements 110 may serve as fluid outlets of at least some of the compartments 106, and may serve as fluid inlets of adjacent compartments 106.

Each of the compartments 106 may be defined in part by a sidewall 112, which may be substantially cylindrical as shown in FIG. 2. The sidewall 112 may be common to all of the compartments 106 in the tank 100, or each of the compartments 106 may have a separate sidewall 112 longitudinally coupled to (e.g., welded to, adhered to, fastened to) the sidewall 112 of an adjacent compartment 106. The compartments 106 may be sized and configured according to the anticipated use of the tank 100. For example, a reduction in sloshing may be obtained by reducing the volume of each compartment 106 and providing a greater number of compartments 106 in a particular size (i.e., total volume) of the tank 100. On the other hand, weight and manufacturing cost may be reduced by increasing the volume of each compartment 106 and providing a lesser number of compartments 106 in the particular size (volume) of the tank 100. One skilled in the art will be capable of selecting a volume of each compartment 106 and a number of compartments 106 suitable for a particular application. By way of example and not limitation, the tank 100 may have between two and twelve compartments 106, such as between six and ten compartments 106. However, the disclosure is not limited to any particular number of compartments 106 per tank 100, and may partially depend on the size (e.g., length) of the tank 100 and of a spacecraft employing the tank 100.

Referring to FIGS. 2 and 3, in some embodiments, each of the compartments 106 may include one or more fins 114 coupled to the end plate 108 thereof and extending to a location proximate the porous element 110. The one or more fins 114 may include one or more substantially planar members extending away from (e.g., perpendicular to) the end plate 108 and generally laterally toward an interior of the compartment 106. As illustrated in FIGS. 2 and 3, the one or more fins 114 may be arranged in, for example, an X shape, radially inner ends of the fins 114 meeting at a center of the porous element 110 and end plate 108. The one or more fins 114 may provide a barrier to inhibit liquid sloshing in lateral directions when the compartment 106 is only partially full of liquid. The one or more fins 114 may also provide surfaces adjacent to the porous element 110 that may be wetted by the liquid, to draw the liquid toward the porous element 110 for flowing the liquid out of the compartment 106 through the porous element 110. Moreover, the fins 114 may inhibit a gas that backfills a partially full compartment 106 from reaching the porous element 110 thereof prior to the compartment 106 being substantially drained of the liquid therein. While four fins 114 located at 90° intervals are depicted, a different even or odd number of fins 114 may be employed, at uniform or different intervals. Further, while planar fins 114 are depicted, non-planar fins 114 may be employed comprising protrusions or arcuate edges opposite the end plate 108 with which the fins 114 are associated to further reduce liquid sloshing tendencies.

By way of example and not limitation, each of the porous elements 110 may be a perforated portion (e.g., central portion) of the end plate 108, a separate perforated plate coupled to the end plate 108, or a screen coupled to the end plate 108. The porous element 110 may be circumscribed by the end plate 108. In some embodiments, the porous element 110 may be at a center of the end plate 108. The porous element 110 may include a metal material (e.g., a metal plate, a metal screen) having openings (e.g., substantially circular pores) extending therethrough. The openings may be formed by micromachining (e.g., electron beam drilling) a metal plate or by providing a woven or non-woven screen, for example.

The openings in the porous element 110 may be sized and configured to allow passage of a liquid within the tank 100 from one compartment 106 to an adjacent compartment 106 upon existence of a pressure differential across the end plate 108 and between the two adjacent compartments 106. Additionally, the openings may in the porous element 110 be sufficiently small to inhibit passage of the liquid through the porous element 110 upon sloshing of the liquid alone (i.e., in the absence of a pressure differential) within a given compartment 106. By way of example and not limitation, the openings of the porous elements 110 may have a size (e.g., diameter, cross-sectional extent) of between about 0.005 inch and about 0.010 inch, such as about 0.007 inch. Opening size may be selected in consideration of viscosity and density of the liquid to be stored within tank 100. A metal plate or screen of the porous element 110, through which the openings extend, may have a thickness of about 0.010 inch to about 0.020 inch, such as about 0.015 inch, for example. The material of the porous elements 110 may be selected to be corrosion resistant when exposed to the liquid to be stored in the tank 100. By way of non-limiting example, the material of the porous elements 110 may include one or more of aluminum, stainless steel, or titanium, depending on the liquid to be stored in the tank 100. For example, if the tank 100 is to be used for storing a propellant, the material of the porous elements 110 may be titanium.

Referring again to FIG. 1, the liquid storage tank 100 may further include an end cap 116 proximate the inlet 102 and proximate the outlet 104. In embodiments in which an interior of the tank 100 is to be pressurized with respect to an exterior of the tank 100, the end caps 116 may be rounded as shown in FIG. 1. In other embodiments in which there is to be no significant pressure within the tank 100, the end caps 116 may have another shape, such as substantially planar.

The inlet 102 may be in fluid communication with a source of pressurized gas, such as a pressure regulation system 118 for pressurizing and back-filling the tank 100 with gas as liquid is drawn out of the tank 100 through the outlet 104. For example, the pressure regulation system 118 may include a separate tank containing a compressed gas, a pump to pressurize a gas, or a gas generator in combination with a buffer tank and a regulator. The pressure regulation system 118 may provide gas to maintain a sufficient pressure in the tank 100 to flow the liquid out of the tank 100 upon opening of a valve at or downstream from the outlet 104. The pressure regulation system 118 may be configured to provide a substantially constant pressure to the tank 100, or may be configured to provide a variable pressure to the tank 100 (e.g., a pressure that changes as a liquid is withdrawn from the tank 100). In embodiments in which the tank 100 is used to store a propellant, one or more thrusters 120 may be in fluid communication with the outlet 104 of the tank 100. A valve 121 may be operably coupled to the outlet 104 to selectively enable flow of liquid from the tank 100 to the one or more thrusters 120.

The liquid storage system 101 according to the disclosure may include one or more of the tank 100, the pressure regulation system 118, and/or the thruster 120. In some embodiments, the liquid storage system 101 may include multiple tanks 100 coupled to each other in series. For example, the outlet 104 of a first tank 100 is in fluid communication with the inlet 102 of a second tank 100. Additional tanks 100 may be coupled to each other in series in this fashion, to provide additional storage capacity. Accordingly, the liquid storage system 101 is modular in that additional liquid storage may be provided with relative ease and low cost.

In a bipropellant system, a first liquid component may be stored in one or more tanks 100 and a second liquid component may be stored in one or more additional tanks 100. The first and second liquid components may be combined downstream of the respective outlets 104 of the tanks 100 (e.g., at the thruster 120 or at a manifold in communication with the thruster 120) for combustion.

To illustrate the operation of the liquid storage system 101, reference is made to FIG. 1, in which is shown a first compartment 106A being substantially fully filled with a liquid 122, a second compartment 106B adjacent to and upstream from the first compartment 106A, the second compartment being only partially full of a liquid 122, and a third compartment 106C adjacent to and upstream from the second compartment 106B, the third compartment 106C being substantially lacking liquid 122 (e.g., no liquid 122 or only a residual amount of liquid 122) therein. Some residual liquid 122 may remain within the third compartment 106C. The tank 100 of the liquid storage system 101 may initially be at least partially filled with the liquid 122, such as a propellant, water, liquid oxygen, liquid nitrogen, or oil. Liquid may be withdrawn from the outlet 104. As liquid is withdrawn from the outlet 104, a pressure in the compartment 106 closest to the outlet 104 may be reduced, resulting in a pressure differential across the end plate 108 and the porous element 110 between the compartment 106 closest to the outlet 104 and the adjacent compartment 106. Accordingly, liquid will flow from the adjacent compartment 106 into the compartment 106 closest to the outlet 104 through the porous element 110. Such pressure differentials and withdrawal of the liquid from the compartments 106 will continue in series through the tank 100. A gas (e.g., a pressurized gas from the pressure regulation system 118) may be used to backfill the tank 100 from the inlet 102. The pressure differentials across the porous elements 110 may result in flow of liquid through the porous elements 110 in a direction from the inlet 102 to the outlet 104.

As used herein, the term "upstream" refers to a direction opposite of a designed direction of bulk fluid flow through the tank(s) 100 from the inlet 102 to the outlet 104. As used herein, the term "downstream" refers to a designed direction of the bulk fluid flow through the tank(s) 100 from the inlet 102 to the outlet 104.

As pressure is reduced in the first compartment 106A, liquid 122 from the second compartment 106B may flow through the porous element 110 between the first compartment 106A and the second compartment 106B toward the first compartment 106A. The volume of liquid 122 in the second compartment 106B may reduce as the liquid 122 flows from the second compartment 106B through the porous element 110 and into the first compartment 106A. The liquid 122 in the second compartment 106B may wet the sidewall 112, porous element 110, and fins 114 (FIGS. 2 and 3) of the second compartment 106B. Therefore, the liquid 122 may tend to flow toward the porous element 110 along the sidewall 112 and fins 114 of the second compartment 106B. Gas from the third compartment 106C may flow into the second compartment 106B, and the volume of gas in the second compartment 106B may increase. As the second compartment 106B is substantially emptied (e.g., no liquid 122 or only a residual amount of the liquid 122 is left in the second compartment 106B), gas may begin to flow from the second compartment 106B into the first compartment 106A.

The process described above may continue in series through the compartments 106 of the tank 100 until each of the compartments 106, and tank 100 as a whole, is substantially fully drained of the liquid 122.

Other than possible residual liquid 122 left in compartments 106 that have been substantially drained of the liquid 122, a volume of the liquid 122 that is subject to sloshing within the tank 100 may be substantially limited to a volume of a single compartment 106. Thus, embodiments of this disclosure may more effectively control and reduce sloshing compared to prior known liquid storage tanks. Accordingly, control of space vehicles including storage of liquids may be improved by using liquid storage systems 101 according to the disclosure.

Figure 4:
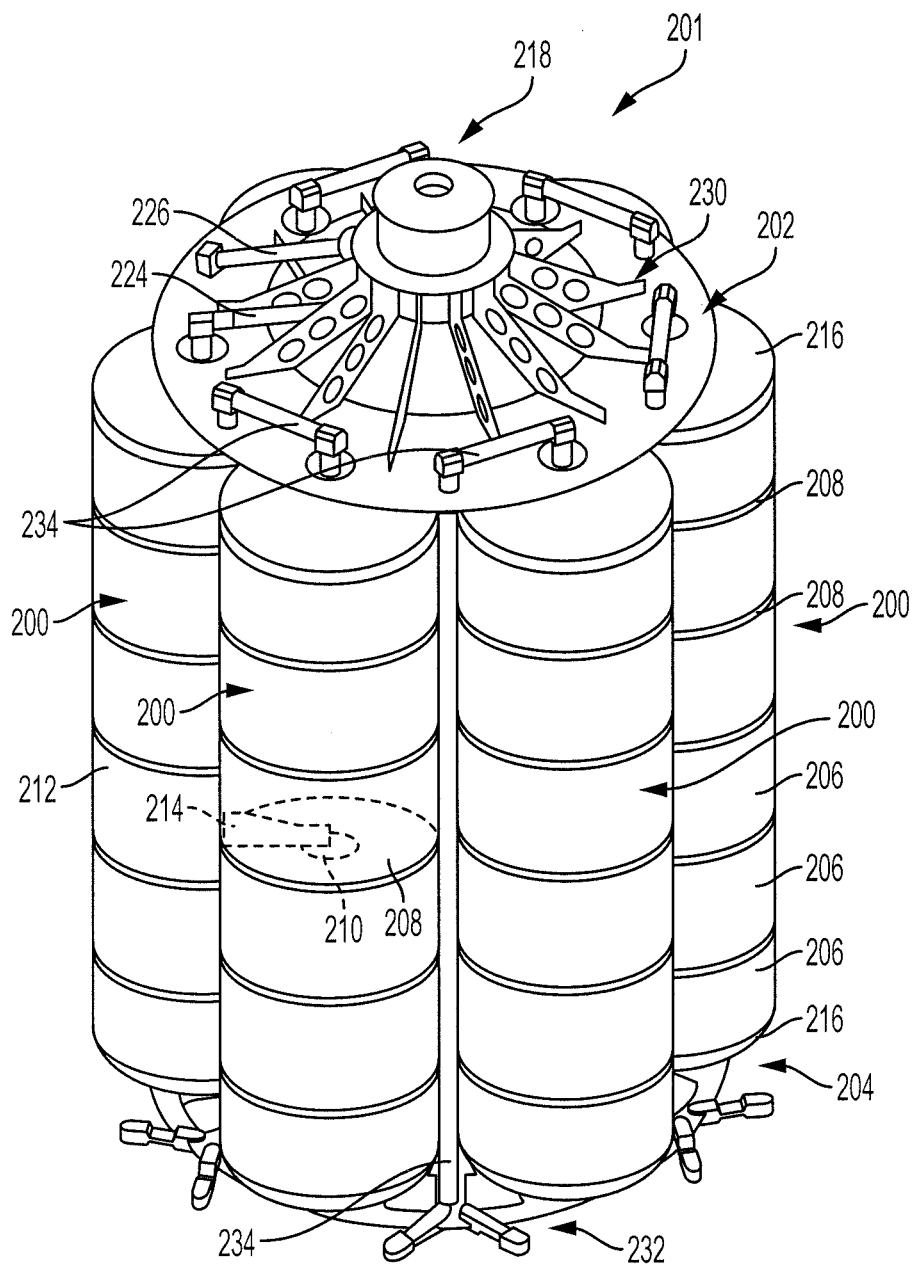
FIG. 4 shows a perspective view of another embodiment of a liquid storage system according to the disclosure.

Referring to FIG. 4, a liquid storage system 201 may include a group of liquid storage tanks 200 that are arranged adjacent to each other and fluidly coupled to each other in series. Each of the tanks 200 may be configured substantially as described above with reference to the tank 100. Accordingly, the tanks 200 may each include an inlet 202, an outlet 204, multiple liquid storage compartments 206 longitudinally coupled to each other in series and separated by respective end plates 208 and porous elements 210, a sidewall 212, and end caps 216. Each of the compartments 206 may include one or more fins 214 (one of which is shown in FIG. 4 in dashed lines). The liquid storage system 201 may include a system inlet 224 and a system outlet 226. A pressure regulation system 218 may be in fluid communication with the system inlet 224, which may be in fluid communication with the inlet 202 of the tank 200 furthest upstream in the liquid storage system 201. The system outlet 226 may be in fluid communication with the outlet 204 of the tank 200 furthest downstream in the liquid storage system 201. The system outlet 226 may be in further selective fluid communication with one or more thrusters, for example.

The liquid storage system 201 may further include upper structural components 230 and lower structural components 232 to secure the tanks 200 to each other and to a supporting structure (e.g., a space vehicle). The outlet 204 of each tank 200 (other than the tank 200 closest to an outlet of the liquid storage system 201) may be in fluid communication with the inlet 202 of a successively downstream tank 200 through a connector pipe 234. From the perspective of FIG. 4, the connector pipes 234 may direct fluid from each outlet 204 at a bottom of a tank 200 perpendicular to the tanks 200, upward and parallel to the tanks 200, and perpendicular to the tanks 200 to an inlet 202 at a top of a downstream tank 200. Alternatively, the tanks 200 may be fluidly connected to each other in a zigzag pattern. In such embodiments, the outlet 204 of each tank 200 may be adjacent to the inlet 202 of a successively downstream tank 200, resulting in bulk flow of a liquid within the liquid storage system 201 upon withdrawal of the liquid from the system outlet 226 downward in one of the tanks 200, upward in a successively downstream tank 200, downward in a further successively downstream tank 200, and so forth.

In some embodiments, the liquid storage system 201 may be configured for storage of liquid components of a bipropellant system, such as a system for combining and combusting a liquid fuel and a liquid oxidizer. In such embodiments, a first group of the tanks 200 (e.g., a first half of the tanks 200) of the liquid storage system 201 may be configured to contain a first liquid component of the bipropellant, and a second, different group of the tanks 200 (e.g., a second half of the tanks 200) may be configured to contain a second liquid component of the bipropellant. Thus, the liquid storage system 201 may include two system inlets 224 and two system outlets 226 (one system inlet 224 and one system outlet 226 for each of the first and second fluid components of the bipropellant). The first and second liquid components of the bipropellant may be combined for combustion at or downstream from the two system outlets 226, such as at a thruster in fluid communication with the two system outlets 226. In some embodiments, the liquid storage system may be configured for storage of three liquid components of a tripropellant system.

Figure 5:
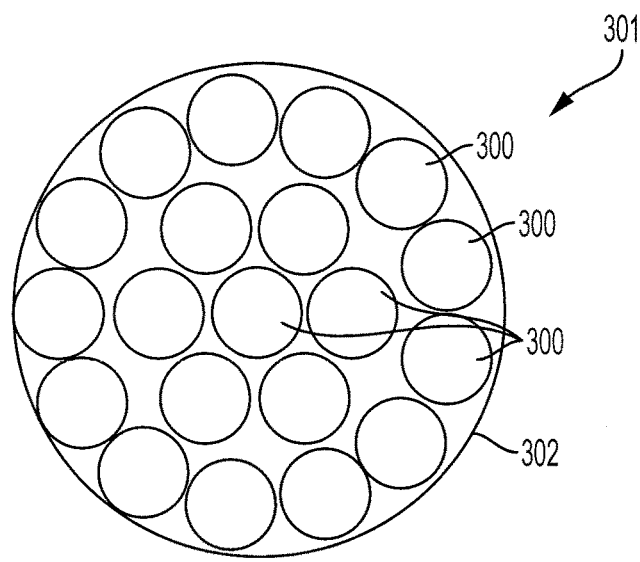
FIG. 5 shows a cutaway side view of another embodiment of a liquid storage system according to the disclosure.

Referring to FIG. 5, liquid storage tanks 300 may be used to form a liquid storage system 301. For example, the liquid storage system 301 may include twenty liquid storage tanks 300 arranged in a circular pattern, with one central liquid storage tank 300, six intermediate liquid storage tanks 300 adjacent to and around the central liquid storage tank 300, and thirteen outer liquid storage tanks 300 adjacent to and around the six intermediate liquid storage tanks 300. In some embodiments, the liquid storage tanks 300 may be positioned within a pressure vessel 302 acting as a source of pressurized gas, or coupled to a pressure regulation system as described above. The liquid storage tanks 300 may be similar to the tanks 100, 200 described above, and may be operably coupled to each other in series as described above.

Figure 6:
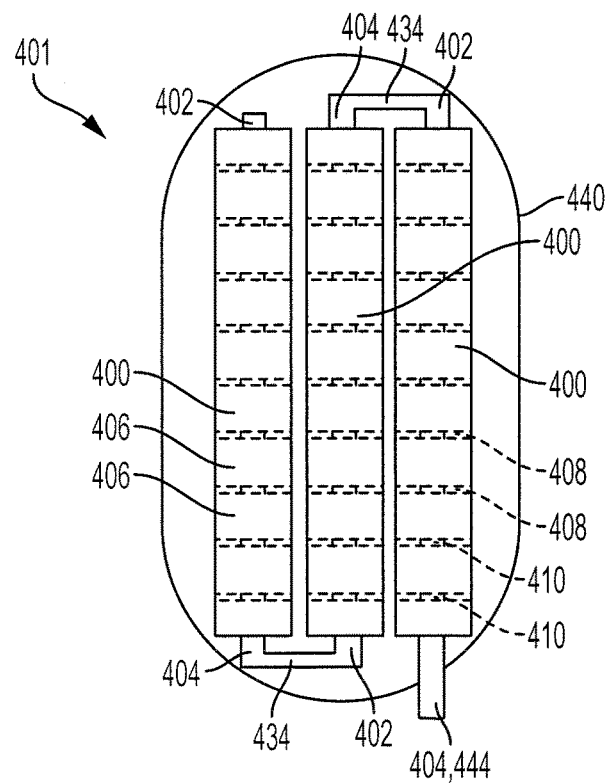
FIG. 6 shows a top view of an embodiment of a liquid storage system according to the disclosure.

Referring to FIG. 6, a liquid storage system 401 may include one or more liquid storage tanks 400 positioned within a pressure vessel 440. The tanks 400 may be similar to the tanks 100, 200, 300 described above, and may include respective inlets 402, outlets 404, and compartments 406 coupled to each other in series. The compartments 406 may be separated from each other by respective end plates 408 associated with respective porous elements 410. The liquid storage tanks 400 may be operably coupled to each other, such as with connector pipes 434 providing fluid communication between successive outlets and inlets of the tanks 400.

A furthest upstream tank 400 may include a tank inlet 402 that is in fluid communication with an interior of the pressure vessel 440. A furthest downstream tank 400 may include a tank outlet 404 that is configured to provide a liquid from within the tanks 400 to an exterior of the pressure vessel 440, such as to a thruster or other propulsion element. Thus, the tank outlet 404 of the furthest downstream tank 400 may function as a system outlet 444. Although only three tanks 400 are shown in FIG. 6 for clarity and ease of illustration, the present disclosure is not so limited, and any number of tanks 400 may be positioned within the pressure vessel 440 depending on the particular application.

In operation, the tanks 400 may be at least partially filled with a liquid (e.g., a propellant), and an interior volume of the pressure vessel 440 may be pressurized with a gas (e.g., nitrogen, helium, other inert gas with respect to the stored liquid, and/or vapor evaporated from the stored liquid) to backfill the tanks 400 as liquid is removed through the system outlet 444. The liquid storage system 401 may be a so-called "blowdown" system, in which pressure provided to the tanks 400 from the pressure vessel 440 reduces as a liquid is withdrawn from the tanks 400. As liquid is withdrawn from the liquid storage system 401 through the system outlet 444, the pressurized gas from within the pressure vessel 440 backfills the tanks 400, and a pressure level within the tanks 400 and the pressure vessel 440 is reduced. The initial pressure level provided to the pressure vessel 440 when the tanks 400 are substantially full of a liquid may be selected based at least in part on a relative volume of the tanks 400 and of the pressure vessel 440 surrounding the tanks 400. The initial pressure level may be selected to result in a sufficient final pressure level within the pressure vessel 440 and tanks 400 to substantially fully force liquid out of the tanks 400 through the system outlet 444. By way of example and not limitation, the internal volume of the tanks 400 and connector pipes 434 may be about ¾ of the total internal volume of the pressure vessel 440. The predetermined initial pressure level may be selected to be about 800 psi. In such an example, a final pressure level (i.e., as a final portion of liquid in the tanks 400 is substantially fully withdrawn through the system outlet 444) within the pressure vessel 440 and tanks 400 may be about 200 psi, for example, as a result of the pressurized gas initially within the pressure vessel 440 expanding to backfill the tanks 400.

Figure 7:
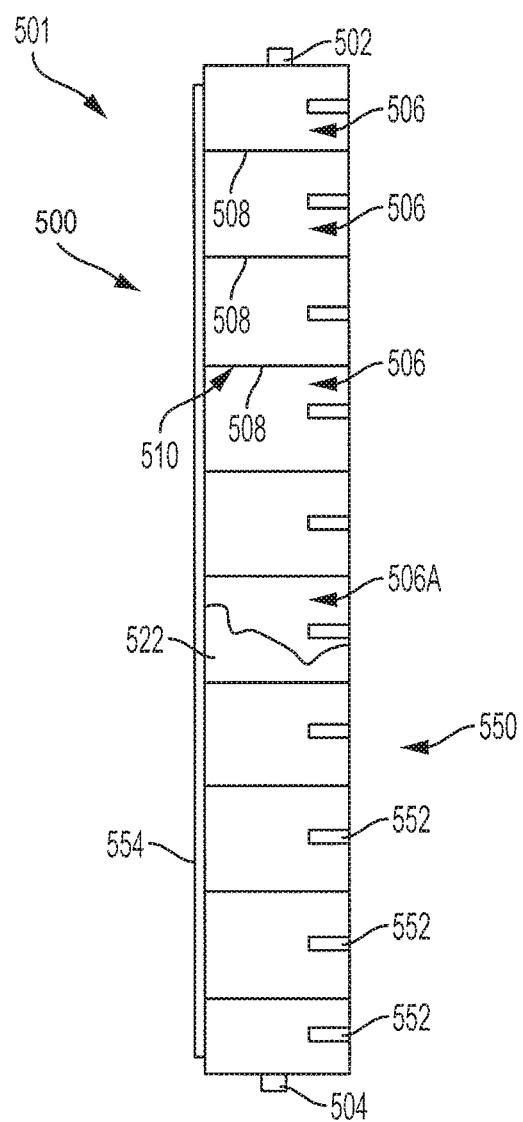
FIG. 7 shows a cross-sectional side view of an embodiment of a liquid storage system including a liquid volume measurement system according to the disclosure.

A cross-sectional side view of an embodiment of a liquid storage system 501 is shown in FIG. 7. The liquid storage system 501 may be similar to any of the liquid storage systems 101, 201, 301, 401 described above, and includes at least one liquid storage tank 500 including a tank inlet 502, a tank outlet 504, and multiple liquid storage compartments 506 coupled to each other in series and separated by respective end plates 508 and associated porous elements 510. The liquid storage system 501 may further include a liquid level gauging system 550 including temperature sensors 552 associated with respective compartments 506 and at least one heat source 554. The temperature sensors 552 may be, for example, thermistors or thermocouples. The temperature sensors 552 may be positioned within the respective compartments 506 along a common side of the tank 500 (e.g., the right side from the perspective of FIG. 7). The at least one heat source 554 may be, for example, a strip heater or an elongated heat plate positioned along an exterior or interior of the tank 500 on an opposite side of the tank 500 from the temperature sensors 552.

In operation, when it is desired to measure a liquid level within the tank 500, the liquid level gauging system 550 may function by activating the heat source 554 to generate heat, and the temperature sensors 552 may measure a thermal response to the generated heat from the heat source 554. By way of illustration, a partially full compartment 506A may include some liquid 522. The compartments 506 upstream from the partially full compartment 506A may be substantially fully filled with a gas and may substantially lack liquid therein. The compartments 506 downstream from the partially full compartment 506A may be substantially fully filled with a liquid. The thermal response will be different in the compartments 506 substantially fully filled with gas, partially full of a liquid, and substantially fully filled due to the differing heat transfer rates. The different masses within each of the compartments 506 may affect a heat transfer rate thereof that is measurable by observing a change in temperature with the temperature sensors 552 upon activating the heat source 554. For example, the temperature sensors 552 in the compartments 506 that are substantially fully filled with gas may experience a relatively quickest increase in temperature after activation of the heat source 554, due to a relatively highest heat transfer rate thereof. The temperature sensors 552 in the compartments 506 that are substantially fully filled with a liquid may experience a relatively slowest increase in temperature after activation of the heat source 554, due to a relatively lowest heat transfer rate thereof. The temperature sensor 552 in the partially full compartment 506A may experience an intermediate increase in temperature after activation of the heat source 554, due to an intermediate heat transfer rate thereof.

In this manner, the level of liquid within the tank 500 may be measured to an accuracy of at least about the volume of one of the compartments 506. In some embodiments, the accuracy of the measurement may be increased by comparing the thermal response of the partially full compartment 506A to the thermal response of the remaining compartments 506. For example, if the thermal response of the partially full compartment 506A is relatively closer to a thermal response of a compartment 506 that is substantially full of a liquid, then a volume of liquid within the partially full compartment 506A may be estimated to be more than half full of a liquid. Similarly, if the thermal response of the partially full compartment 506A is relatively closer to a thermal response of a compartment 506 that is substantially full of a gas, then a volume of liquid within the partially full compartment 506A may be estimated to be less than half full of a liquid. Further increased accuracy of measurement may be obtained by calibrating the thermal responses of the compartments 506, such as by measuring respective thermal responses of a compartment 506 when known ratios of liquid and gas are within the compartment 506.

The embodiments of the disclosure described above and illustrated in the accompanying drawing figures do not limit the scope of the invention, since these embodiments are merely examples of embodiments of the disclosure. The invention is encompassed by the appended claims and their legal equivalents. Any equivalent embodiments lie within the scope of this disclosure. Indeed, various modifications of the disclosure, in addition to those shown and described herein, such as other combinations and modifications of the elements described, will become apparent to those of ordinary skill in the art from the description. Such embodiments, combinations, and modifications also fall within the scope of the appended claims and their legal equivalents.

What is claimed is:

1. A liquid storage system for a space vehicle, the liquid storage system comprising:
    at least one liquid storage tank, comprising:
        a tank inlet;
        a tank outlet for withdrawing a liquid from within the at least one liquid storage tank;
        a plurality of liquid storage compartments coupled to each other in series between the tank inlet and the tank outlet, each liquid storage compartment of the plurality of liquid storage compartments comprising:
            an end plate comprising a porous outlet at an end of the liquid storage compartment adjacent to another liquid storage compartment; and
            one or more fins disposed within each liquid storage compartment, each of the one or more fins being coupled to a respective end plate of a respective liquid storage compartment and extending from an outer peripheral portion of the respective end plate and over the porous outlet of the end plate.

2. The liquid storage system of claim 1, further comprising a source of pressurized gas coupled to and in fluid communication with the tank inlet.

3. The liquid storage system of claim 2, wherein the source of pressurized gas comprises a volume defined by a shell at least partially surrounding the at least one liquid storage tank.

4. The liquid storage system of claim 2, wherein the source of pressurized gas comprises at least one of a tank containing pressurized gas operably connected to the liquid storage compartments, a pump, or a gas generator.

5. The liquid storage system of claim 1, wherein the one or more fins extend away from the porous outlet of the end plate toward an interior of the liquid storage compartment.

6. The liquid storage system of claim 5, wherein the one or more fins within each liquid storage compartment comprises multiple fins extending inwardly from an outer wall of the respective liquid storage compartment, the fins meeting at a center of the liquid storage compartment.

7. The liquid storage system of claim 1, wherein each liquid storage compartment comprises a solid end plate circumscribing the porous outlet.

8. The liquid storage system of claim 1, wherein the plurality of liquid storage compartments comprises at least a first liquid storage compartment connected to at least a second liquid storage compartment in series, the porous outlet of the first liquid storage compartment serving as a porous inlet of the second liquid storage compartment.

9. The liquid storage system of claim 1, wherein the plurality of liquid storage compartments comprises at least one cylindrical stack of liquid storage compartments.

10. The liquid storage system of claim 1, wherein the at least one liquid storage tank comprises a first liquid storage tank and at least a second liquid storage tank of substantially the same configuration as the first liquid storage tank, the tank outlet of the first liquid storage tank being in fluid communication with a tank inlet of the second liquid storage tank.

11. A propulsion system for a space vehicle, the propulsion system comprising:
    a liquid storage system, comprising:
        at least one liquid storage tank including:
            a first liquid storage compartment;
            a second liquid storage compartment coupled to the first liquid storage compartment and to an outlet;

an end plate comprising a porous element separating the first liquid storage compartment and the second liquid storage compartment, the porous element comprising a plurality of pores sized and configured for passage of a liquid from the first liquid storage compartment to the second liquid storage compartment responsive to a pressure differential across the porous element and to substantially inhibit passage of the liquid from the second liquid storage compartment to the first liquid storage compartment upon sloshing of the liquid in the second liquid storage compartment against the porous element; and one or more fins disposed within the first liquid storage compartment, the one or more fins being coupled to the end plate and extending from an outer peripheral portion of the end plate and over the porous outlet of the end plate; and one or more thrusters operably coupled to the outlet of the liquid storage system.

12. The propulsion system of claim 11, wherein the porous element comprises a plate including a plurality of substantially circular pores perforating the plate.

13. The propulsion system of claim 11, further comprising one or more additional fins within the second liquid storage compartment, wherein the one or more fins and the one or more additional fins are located and configured to inhibit sloshing of a liquid within the first liquid storage compartment and within the second liquid storage compartment.

14. The propulsion system of claim 11, wherein the at least one liquid storage tank further comprises an inlet, and wherein the propulsion system further comprises a source of pressurized gas in fluid communication with the inlet.

15. The propulsion system of claim 11, further comprising a liquid level gauging system, comprising:

a first temperature sensor positioned within the first liquid storage compartment;

a second temperature sensor positioned within the second liquid storage compartment; and at least one heat source positioned adjacent to the first liquid storage compartment and to the second liquid storage compartment.

16. A method of providing a liquid propellant to a thruster of a space vehicle in a low-gravity environment, the method comprising:

withdrawing a liquid propellant from a first compartment within a tank to induce a pressure differential across an end plate separating the first compartment from an adjacent second compartment;

flowing the liquid propellant from the second compartment into the first compartment through a porous element associated with the end plate in response to the induced pressure differential; and flowing the liquid propellant from the second compartment into the first compartment over at least one fin extending over the porous element and disposed within the second compartment.

17. The method of claim 16, further comprising flowing a gas into the second compartment to backfill the second compartment as the liquid propellant is flowed from the second compartment into the first compartment.

18. The method of claim 17, further comprising substantially fully draining the second compartment of the liquid propellant into the first compartment before flowing a gas into the first compartment to backfill the first compartment as the liquid propellant is withdrawn therefrom.

19. The method of claim 16, further comprising flowing the liquid propellant from a third compartment into the second compartment through another porous element associated with another end plate separating the second compartment from the third compartment.

20. The method of claim 16, wherein withdrawing the liquid propellant from the first compartment comprises opening a valve coupled to an outlet of the tank.

* * * * *